Figures 8, 9, 10:
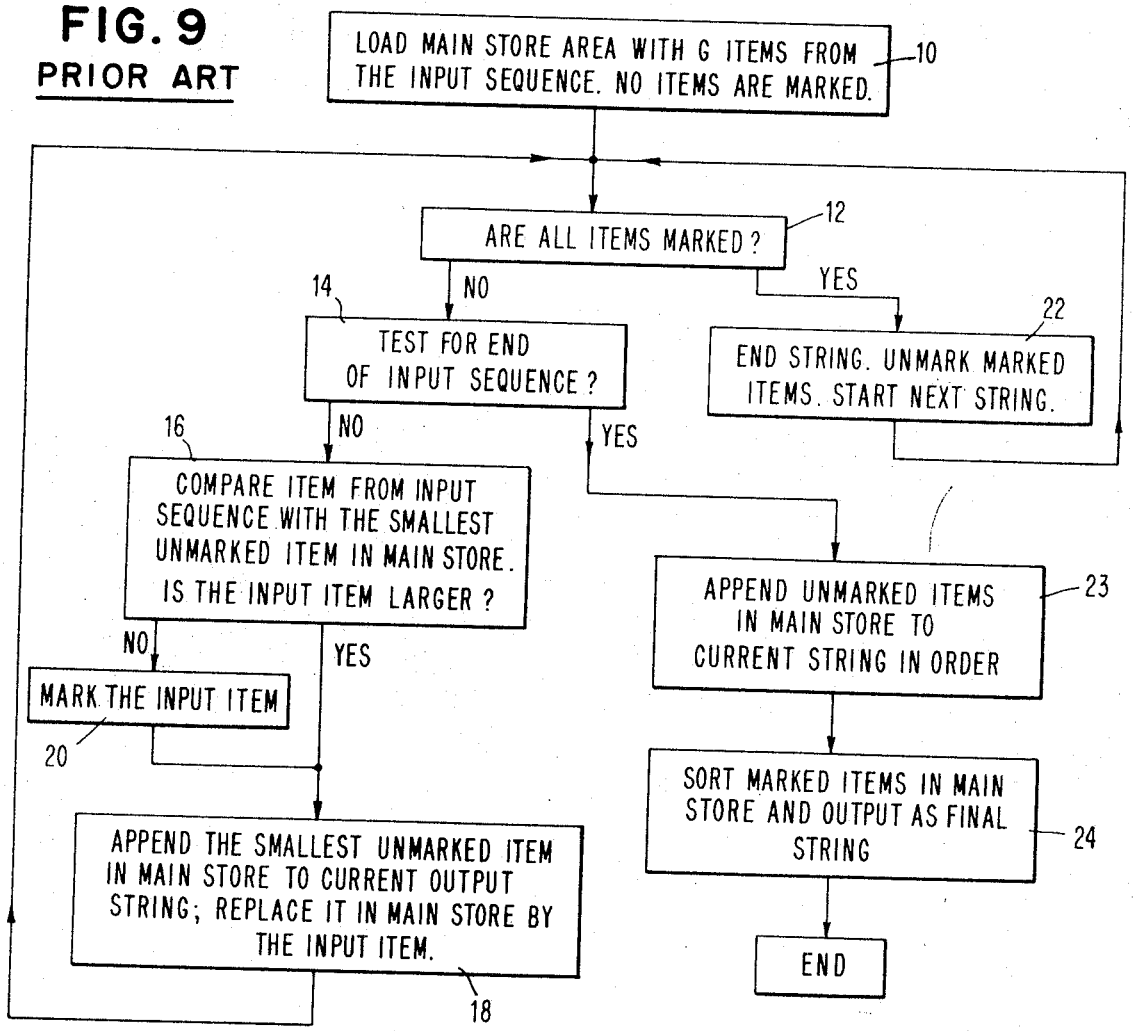
FIG. 9 PRIOR ART
Figure 11:
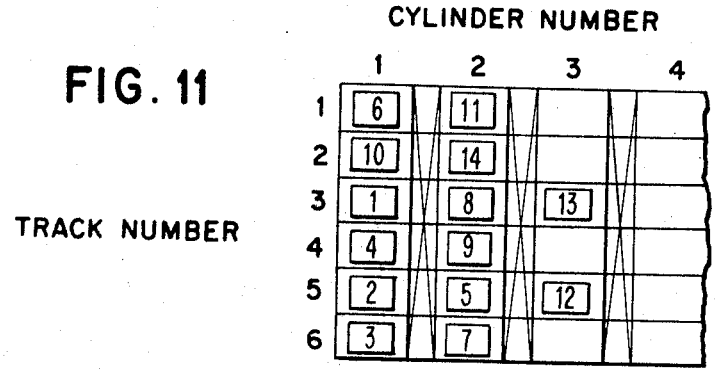
Figure 12:
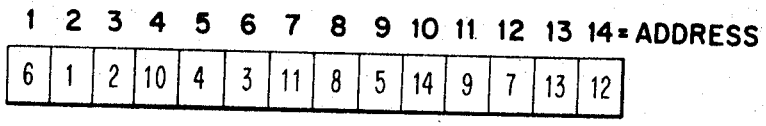
Figure 13:
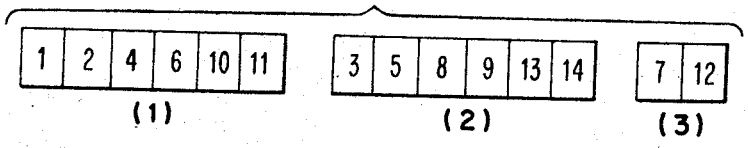
Figure 14:
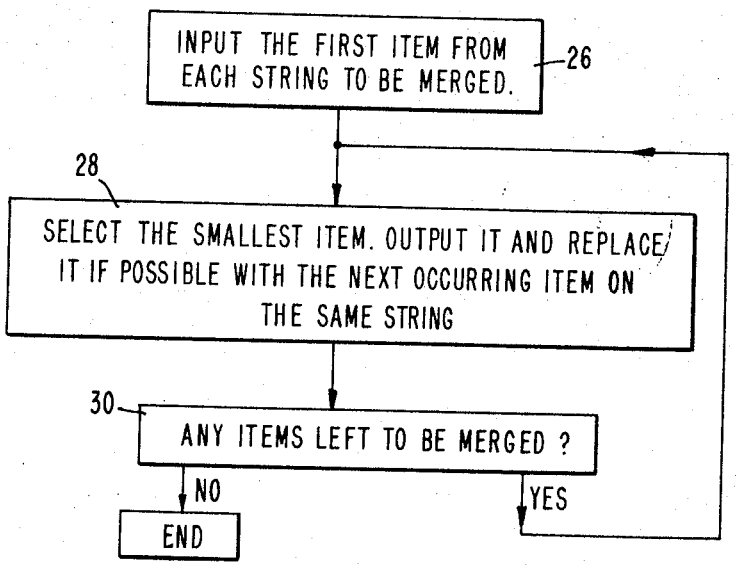
FIG. 14 PRIOR ART
Figure 19:
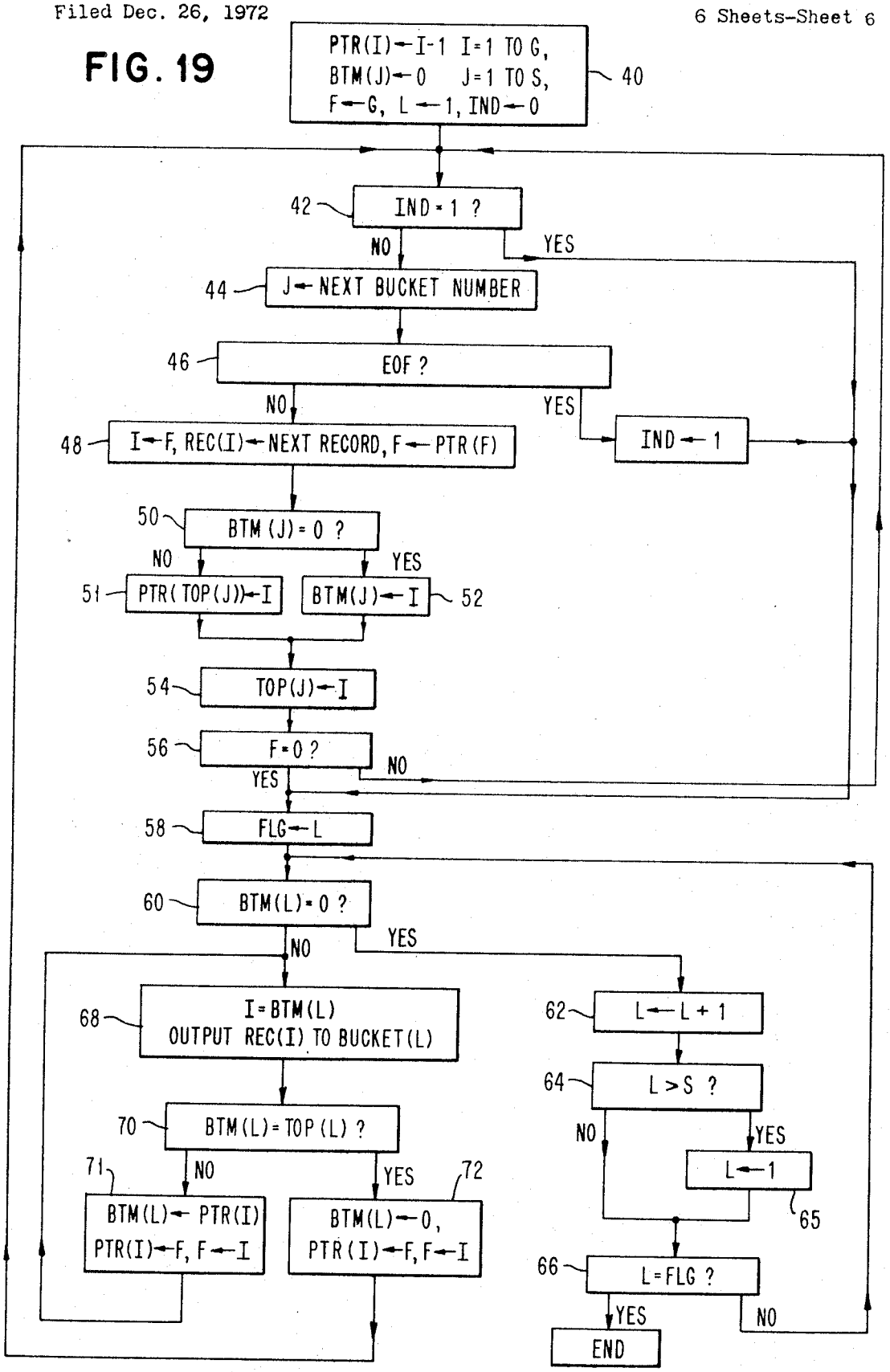

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 10, 1973

912 O.G. 403

T912,008
METHOD FOR REORDERING THE RECORDS OF A FILE

Brian T. Bennett, Mohegan Lake, and Archie C. McKellar, Mount Kisco, N.Y., assignors to International Business Machines Corporation, Armonk, N.Y.

Filed Dec. 26, 1972, Ser. No. 318,335
Int. Cl. G06f *7/24*
U.S. Cl. 444—1
6 Sheets Drawing. 40 Pages Specification

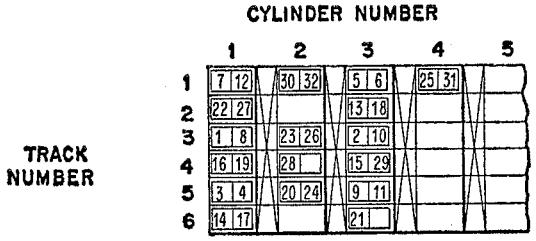

There is described herein a method for the reordering of a file whereby, after such reordering, the records constituting the file are arranged such that the order of their key values is biased in a sequential direction. The file is thus advantageously preconditioned for being sorted, particularly by a distribution sort technique. The method first entails the performing of an internal sort by replacement selection on the file to provide a plurality of strings of records, the records constituting the respective strings being in ordered sequences, the strings being consecutively numbered as they are created in the internal sort, viz., first to *m*th strings. If desired, the records in the strings can be blocked, i.e., each block containing 1, 2, . . . , *k* records as desired. The records are then written onto a "direct access" storage device such as a disk or a drum in a manner whereby the first block of the first string is placed on the first sector of the first track of the storage, the second block of the first string is placed on the second sector of the first track, etc., the first block of the second string is placed on the second sector of the second track, the first block of the third string is placed on the third sector of the third track, et seq. Thus, if $B_{ij}$ represents the *j*th block of the *i*th string, then the blocks are written onto the storage device as follows:

| | Sectors | | | | |
|---|---|---|---|---|---|
| Tracks | 1 | 2 | 3 | *n* | |
| 1 | $B_{11}$ | $B_{12}$ | $B_{13}$ . . . | $B_{1n}$ | . . . |
| 2 | | $B_{21}$ | $B_{22}$ . . . | $B_{2,\,n-1}$ | . . . |
| 3 | | | $B_{31}$ . . . | $B_{3,\,n-2}$ | . . . |
| ⋮ | | | | ⋮ | |
| *m* | | | $B_{m1}$ . . . | $B_{m,\,n-m+1}$ | . . . |

With the records so arranged on the direct access storage device, they are read diagonally therefrom, i.e., the first block of the first string followed by the first block of the second string et seq., then the second block of the first string followed by the second block of the second string, et seq., to produce a file having the order $$B_{11}, B_{21}, \ldots, B_{m1}, B_{12}, B_{22}, \ldots$$
$$B_{m2}, \ldots, B_{m3}, \ldots, B_{mn}$$

With the placing of the blocks on the "direct access" storage device in this manner, the arrangement is effected whereby the beginning of the next block to be read/written is rotationally adjacent to the end of the last block which was read/written whereby latency and seek time are significantly minimized. The reordering of the file produced from the reading out of the blocks in the diagonal manner as described hereinabove can now be advantageously utilized in a distribution sort, such as of the tag or record types.

METHOD FOR REORDERING THE RECORDS OF A FILE

Filed Dec. 26, 1972 6 Sheets-Sheet 1

FIG. 1

INPUT FILE

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 12 | 22 | 7 | 27 | 1 | 30 | 32 | 8 | 28 | 19 | 16 | 23 | 26 | 3 | 4 | 17 | 14 | 20 | 13 | 6 | 24 | 5 | 25 | 2 | 18 | 15 | 31 | 10 | 29 | 9 | 11 | 21 |

FIG. 2

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 7 | 12 | 22 | 27 | 30 | 32 | 1 | 8 | 16 | 19 | 23 | 26 | 28 | 3 | 4 | 14 | 17 | 20 | 24 | 5 | 6 | 13 | 18 | 25 | 31 | 2 | 10 | 15 | 29 | 9 | 11 | 21 |
| (1) | | | | | | (2) | | | | | | | (3) | | | | | | (4) | | | | | | (5) | | | | (6) | | |

CYLINDER NUMBER

| TRACK NUMBER | 1 | 2 | 3 | 4 | 5 |
|---|---|---|---|---|---|
| 1 | 7 12 | 30 32 | 5 6 | 25 31 | |
| 2 | 22 27 | | 13 18 | | |
| 3 | 1 8 | 23 26 | 2 10 | | |
| 4 | 16 19 | 28 | 15 29 | | |
| 5 | 3 4 | 20 24 | 9 11 | | |
| 6 | 14 17 | | 21 | | |

FIG. 3

FIG. 4

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 7 | 12 | 1 | 8 | 3 | 4 | 5 | 6 | 2 | 10 | 9 | 11 | 22 | 27 | 16 | 19 | 14 | 17 | 13 | 12 | 15 | 29 | 21 | 30 | 32 | 23 | 26 | 20 | 24 | 25 | 31 | 28 |

FIG. 5
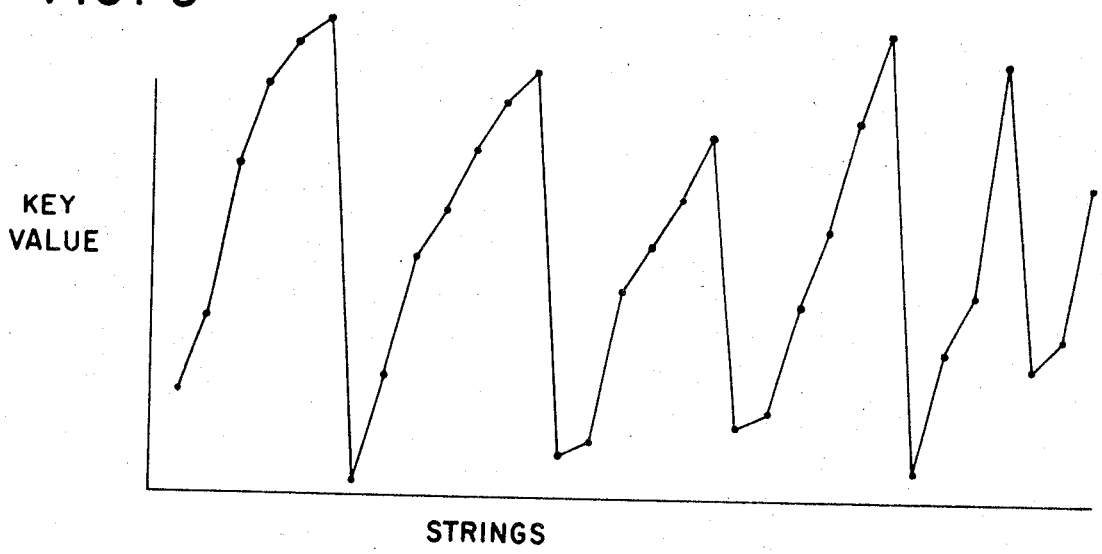
FIG. 6
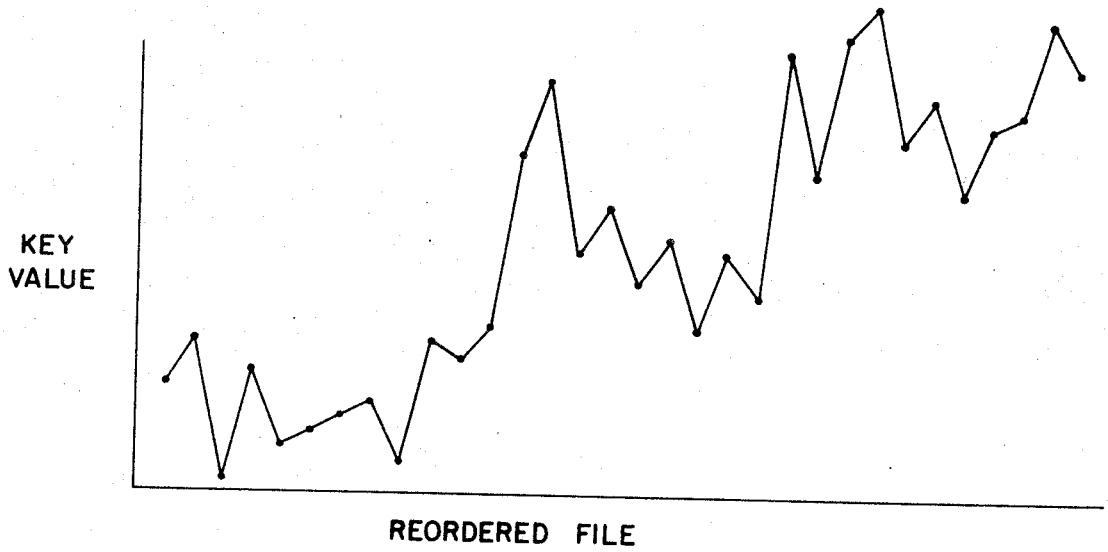
FIG. 7
| | | | | |
|---|---|---|---|---|
| $B_{11}$ | $B_{12}$ | $B_{13}$ | ---------- | $B_{1u}$ |
| $B_{2u}$ | $B_{21}$ | $B_{22}$ | ---------- | $B_{2u-1}$ |
| $B_{3u-1}$ | $B_{3u}$ | $B_{31}$ | ---------- | |
| ⋮ | | | | |
| | | | | |

METHOD FOR REORDERING THE RECORDS OF A FILE

Filed Dec. 26, 1972 6 Sheets-Sheet 3

F =

| | | | | | | | | | | | | |
|---|---|---|---|---|---|---|---|---|---|---|---|---|
| 11 | 6 | 14 | 10 | 4 | 1 | 8 | 9 | 2 | 13 | 7 | 3 | 12 | 5 |

| | | | |
|---|---|---|---|
| 6 | 10 | 11 | 14 |

(1)

| | | | | |
|---|---|---|---|---|
| 1 | 4 | 8 | 9 | 13 |

(2)

| | | | | |
|---|---|---|---|---|
| 2 | 3 | 5 | 7 | 12 |

(3)

FIG. 15

| 1 | 2 | 3 | 4 | 5 | 6 | 7 | 8 | 9 | 10 | 11 | 12 | 13 | 14 | = RECORDS' KEYS |
|---|---|---|---|---|---|---|---|---|---|---|---|---|---|---|
| 2 | 3 | 6 | 5 | 9 | 1 | 12 | 8 | 11 | 4 | 7 | 14 | 13 | 10 | = ADDRESSES |

FIG. 16

| STRING 1 | | | | | STRING 2 | | | | | | | | |
|---|---|---|---|---|---|---|---|---|---|---|---|---|---|
| 14 | 13 | 10 | 7 | 4 | 12 | 11 | 9 | 8 | 6 | 5 | 3 | 2 | 1 |

FIG. 17

| 1 | 2 | 3 | 4 | 5 | 6 | 7 | 8 | 9 | 10 | 11 | 12 | 13 | 14 | ADDRESS |
|---|---|---|---|---|---|---|---|---|---|---|---|---|---|---|
| 2 | 2 | 2 | 1 | 2 | 2 | 1 | 2 | 2 | 1 | 2 | 2 | 1 | 1 | STRING NO. |

FIG. 18

| | | | | | | | | | | | | | |
|---|---|---|---|---|---|---|---|---|---|---|---|---|---|
| 6 | 1 | 2 | 10 | 4 | 3 | 11 | 8 | 5 | 14 | 9 | 7 | 13 | 12 |

FIG. 20

| BUCKET 2 | | | | | | | | | BUCKET 1 | | | | |
|---|---|---|---|---|---|---|---|---|---|---|---|---|---|
| 6 | 1 | 2 | 4 | 3 | 8 | 5 | 9 | 7 | 10 | 11 | 14 | 13 | 12 |

METHOD FOR REORDERING THE RECORDS OF A FILE

Filed Dec. 26, 1972 6 Sheets-Sheet 6